United States Patent
Barker

(10) Patent No.: US 9,520,819 B2
(45) Date of Patent: Dec. 13, 2016

(54) SYSTEM AND METHOD FOR CONTROLLING A POWER GENERATION SYSTEM BASED ON A DETECTED ISLANDING EVENT

(71) Applicant: General Electric Company, Schenectady, NY (US)

(72) Inventor: Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 14/193,786

(22) Filed: Feb. 28, 2014

(65) Prior Publication Data

US 2015/0249416 A1 Sep. 3, 2015

(51) Int. Cl.
*F03D 9/00* (2016.01)
*H02P 9/10* (2006.01)
(Continued)

(52) U.S. Cl.
CPC . *H02P 9/10* (2013.01); *F03D 7/00* (2013.01); *F03D 9/003* (2013.01); *H02H 7/067* (2013.01);
(Continued)

(58) Field of Classification Search
None
See application file for complete search history.

(56) References Cited

U.S. PATENT DOCUMENTS 5,422,518 A * 6/1995 Sashida ............... H02J 3/38
307/75
6,107,784 A 8/2000 Nomiya et al.
(Continued)

FOREIGN PATENT DOCUMENTS

CN 100480721 C 4/2009
CN 101237145 B 6/2010
(Continued)

OTHER PUBLICATIONS

Shanthini et al. "Power Quality Enhancement of Wind Generators Connected to Grid", 2012 IEEE, pp. 398-403.*
(Continued)

*Primary Examiner* — Van Nguyen
(74) *Attorney, Agent, or Firm* — Dority & Manning, P.A.

(57) ABSTRACT

In one aspect, a method for controlling the operation of a power generation system configured to supply power to an electrical grid may generally include detecting an occurrence of an islanding event associated with the power generation system and adjusting a regulator gain applied within a regulator of the power generation system to an islanding gain value in response to the detection of the islanding event, wherein the islanding gain value exceeds a maximum gain value defined for the regulator in the event of an occurrence of any ride-through transient event. In addition, the method may include controlling a power converter of the power generation system based on a control signal generated by the regulator as the power generation system is being isolated from the electrical grid and shutting down the power generation system upon isolation of the power generation system from the electrical grid.

18 Claims, 6 Drawing Sheets

(51) Int. Cl.
  *F03D 7/00*  (2006.01)
  *H02H 7/06*  (2006.01)
  *H02M 5/42*  (2006.01)
  *H02P 9/00*  (2006.01)
  *H02P 9/04*  (2006.01)
  *H02J 3/38*  (2006.01)

(52) U.S. Cl.
  CPC .............. *H02J 3/386* (2013.01); *H02M 5/42* (2013.01); *H02P 9/007* (2013.01); *H02P 9/04* (2013.01); *H02J 2003/388* (2013.01); *Y02E 10/725* (2013.01); *Y02E 10/763* (2013.01)

(56) References Cited

U.S. PATENT DOCUMENTS

| | | | |
|---|---|---|---|
| 6,172,889 B1 | 1/2001 | Eguchi et al. | |
| 6,459,175 B1* | 10/2002 | Potega | B60L 11/185 307/132 M |
| 6,487,096 B1* | 11/2002 | Gilbreth | H02J 1/10 363/35 |
| 6,664,654 B2 | 12/2003 | Wall et al. | |
| 6,815,932 B2* | 11/2004 | Wall | H02J 3/38 290/52 |
| 7,015,597 B2 | 3/2006 | Colby et al. | |
| 7,106,564 B2* | 9/2006 | Deng | H02J 3/38 361/187 |
| 7,138,728 B2 | 11/2006 | LeRow et al. | |
| 7,225,087 B1 | 5/2007 | Siciliano et al. | |
| 7,248,946 B2 | 7/2007 | Bashaw et al. | |
| 7,271,571 B2 | 9/2007 | Ye et al. | |
| 7,408,268 B1 | 8/2008 | Nocentini et al. | |
| 7,629,705 B2 | 12/2009 | Barker et al. | |
| 7,638,983 B2* | 12/2009 | Park | H02M 5/4585 290/44 |
| 7,701,085 B2 | 4/2010 | Ito et al. | |
| 7,745,956 B2 | 6/2010 | Ito et al. | |
| 7,804,184 B2* | 9/2010 | Yuan | H02J 3/386 290/44 |
| 7,840,313 B2 | 11/2010 | Horio et al. | |
| 7,843,082 B2 | 11/2010 | Chou et al. | |
| 7,928,780 B1 | 4/2011 | Yuan et al. | |
| 8,014,181 B2 | 9/2011 | Tan et al. | |
| 8,046,109 B2 | 10/2011 | Larsen et al. | |
| 8,068,352 B2 | 11/2011 | Yu et al. | |
| 8,200,372 B2 | 6/2012 | Joos et al. | |
| 8,310,074 B2* | 11/2012 | Larsen | F03D 9/003 290/44 |
| 8,341,434 B2 | 12/2012 | Gervais et al. | |
| 8,378,515 B2 | 2/2013 | Fortmann | |
| 8,823,416 B2* | 9/2014 | Thacker | H03L 7/085 307/87 |
| 9,124,138 B2* | 9/2015 | Mori | H02J 3/34 |
| 2008/0204044 A1 | 8/2008 | Ponnaluri et al. | |
| 2011/0058398 A1 | 3/2011 | Agbossou et al. | |
| 2011/0101689 A1* | 5/2011 | Larsen | F03D 9/003 290/44 |
| 2012/0029716 A1 | 2/2012 | Sekoguchi et al. | |
| 2013/0062957 A1 | 3/2013 | Bhavaraju et al. | |
| 2013/0114302 A1 | 5/2013 | Escobar et al. | |
| 2013/0169309 A1 | 7/2013 | Bickel | |
| 2013/0187454 A1 | 7/2013 | Timbus et al. | |
| 2013/0264882 A1* | 10/2013 | Abasolo | F03D 9/003 307/80 |
| 2014/0152331 A1* | 6/2014 | Wagoner | G01R 27/16 324/705 |
| 2014/0265596 A1* | 9/2014 | Yuan | H02J 3/382 307/69 |

FOREIGN PATENT DOCUMENTS

| | | |
|---|---|---|
| CN | 101257209 B | 6/2010 |
| CN | 101123349 B | 11/2010 |
| CN | 102156233 A | 8/2011 |
| CN | 201956675 U | 8/2011 |
| CN | 102185335 A | 9/2011 |
| CN | 102208817 A | 10/2011 |
| CN | 102222932 A | 10/2011 |
| CN | 102222934 A | 10/2011 |
| CN | 102255329 A | 11/2011 |
| CN | 102255330 A | 11/2011 |
| CN | 102290802 A | 12/2011 |
| CN | 202084950 U | 12/2011 |
| CN | 102355002 A | 2/2012 |
| CN | 102412591 A | 4/2012 |
| CN | 102412592 A | 4/2012 |
| CN | 102437587 A | 5/2012 |
| CN | 102439299 A | 5/2012 |
| CN | 102545262 A | 7/2012 |
| CN | 102590663 A | 7/2012 |
| CN | 102624027 A | 8/2012 |
| CN | 102721885 A | 10/2012 |
| CN | 102723735 A | 10/2012 |
| CN | 101741101 B | 11/2012 |
| CN | 102830312 A | 12/2012 |
| CN | 102841279 A | 12/2012 |
| CN | 202614881 U | 12/2012 |
| CN | 102856876 A | 1/2013 |
| CN | 101931219 B | 2/2013 |
| CN | 102969794 A | 3/2013 |
| CN | 202817690 U | 3/2013 |
| CN | 103036250 A | 4/2013 |
| CN | 103048558 A | 4/2013 |
| CN | 103050990 A | 4/2013 |
| CN | 103091604 A | 5/2013 |
| CN | 103117554 A | 5/2013 |
| CN | 103124068 A | 5/2013 |
| CN | 202940577 U | 5/2013 |
| CN | 102270854 B | 7/2013 |
| CN | 103199563 A | 7/2013 |
| CN | 103207335 A | 7/2013 |
| CN | 103227478 A | 7/2013 |
| CN | 203084143 U | 7/2013 |
| EP | 0677911 B1 | 3/2000 |
| EP | 0746078 B1 | 9/2002 |
| EP | 2368303 A1 | 6/2010 |
| JP | 2008061360 A | 3/2008 |
| JP | 2009011037 A | 1/2009 |
| JP | 2009136095 A | 6/2009 |
| JP | 2009136096 A | 6/2009 |
| JP | 2011030306 A | 2/2011 |
| JP | 2011055678 A | 3/2011 |
| KR | 932502 B1 | 6/2009 |
| KR | 2009100704 A | 4/2011 |
| KR | 2012057480 A | 6/2012 |
| KR | 1199291 B1 | 8/2012 |
| KR | 2011138992 A | 7/2013 |
| TW | 201015822 A | 4/2010 |
| TW | 201126177 A | 8/2011 |
| TW | 201126185 A | 8/2011 |
| WO | WO 2011157307 A1 | 12/2011 |

OTHER PUBLICATIONS

Shaltout et al. "Power Coordination of Grid-Connected Wind Turbine Doubly Fed Induction Generator Augmented with Battery Storage", 2013 IEEE, pp. 1-6.*

Elsaiah et al. "Power Flow Analysis of Distribution Systems with Embedded Induction Generators", 2012 IEEE, 6 pages.*

Feltes et al. "Wind Turbine Generator Dynamic Performance with Weak Transmission Grids", 2012 IEEE, pp. 1-7.*

Thacker et al. "Single-Phase Islanding Detection based on Phase-Locked Loop Stability", 2009 IEEE, pp. 3371-3377.*

International Search Report and Written Opinion issued in connection with corresponding PCT Application No. PCT/US2015/016568 dated Jun. 3, 2015.

Samui et al., "New active islanding detection scheme for constant power and constant current controlled inverter-based distributed

(56) References Cited

OTHER PUBLICATIONS generation" IET Generation, Transmission&Distribution, vol. No. 7, Issue No. 7, pp. 779-789, Jul. 1, 2013.

\* cited by examiner

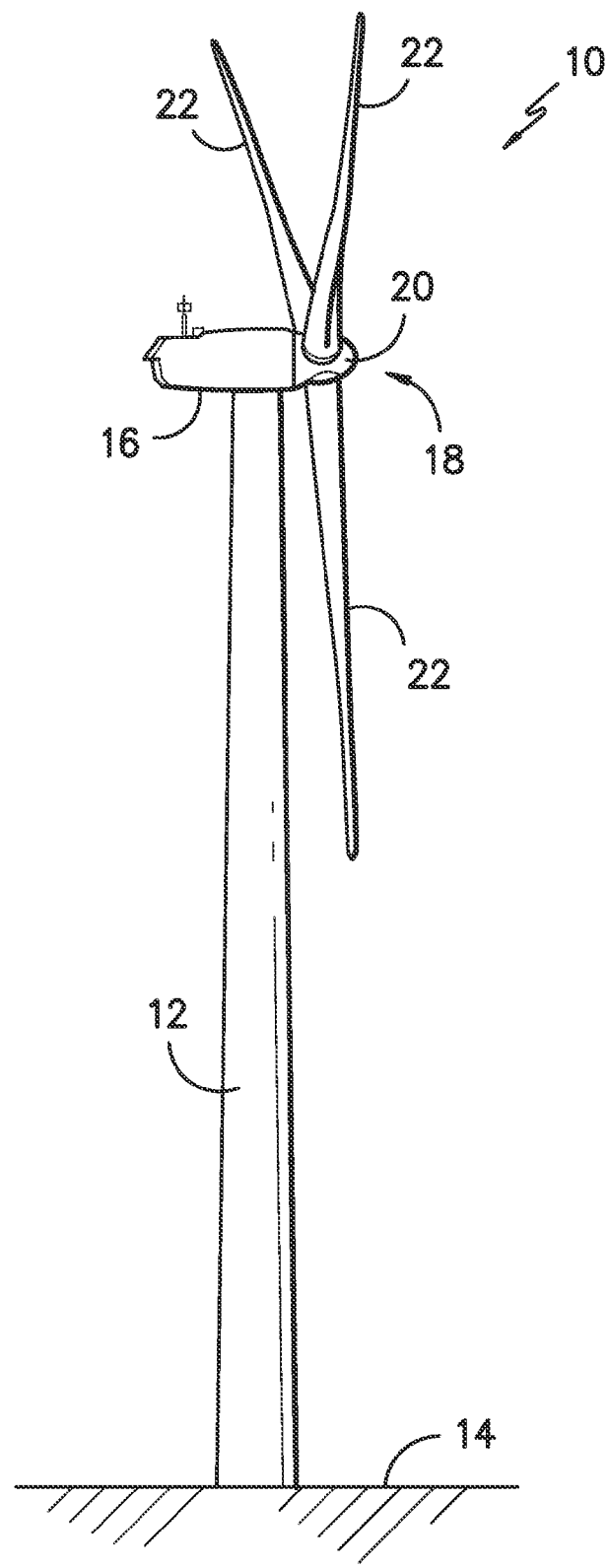
FIG. -1-

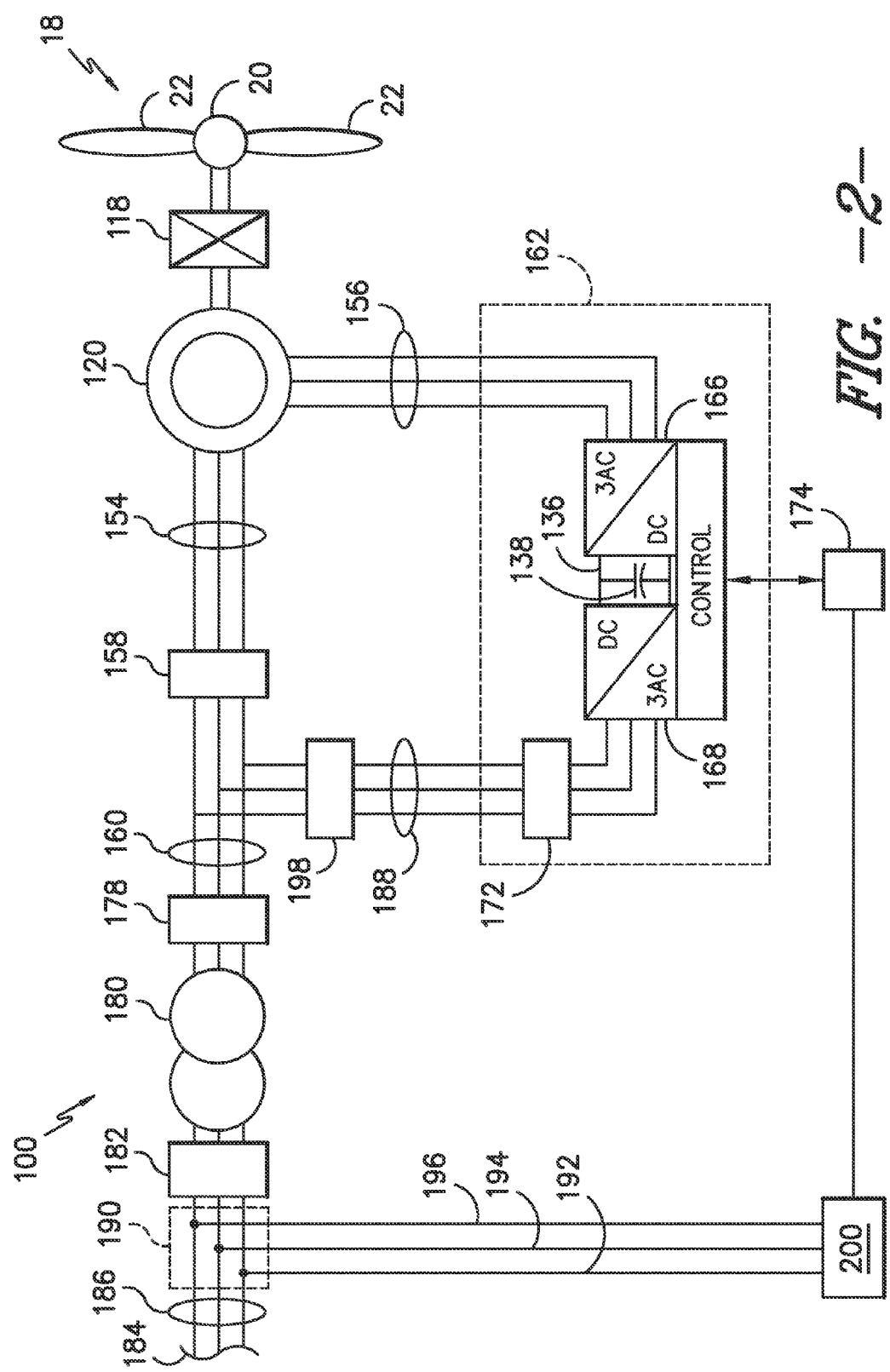
FIG. -2-

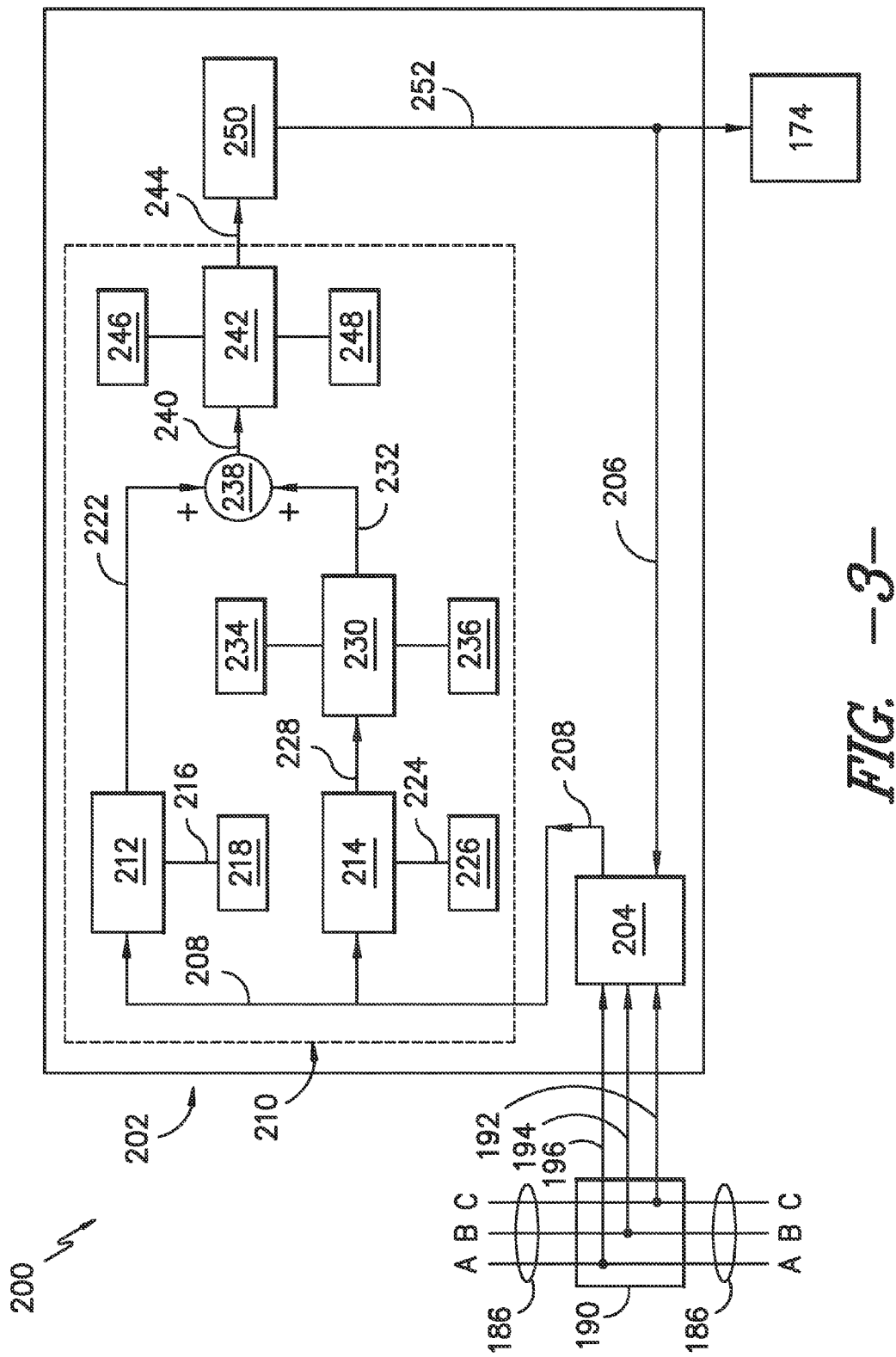
FIG. -3-

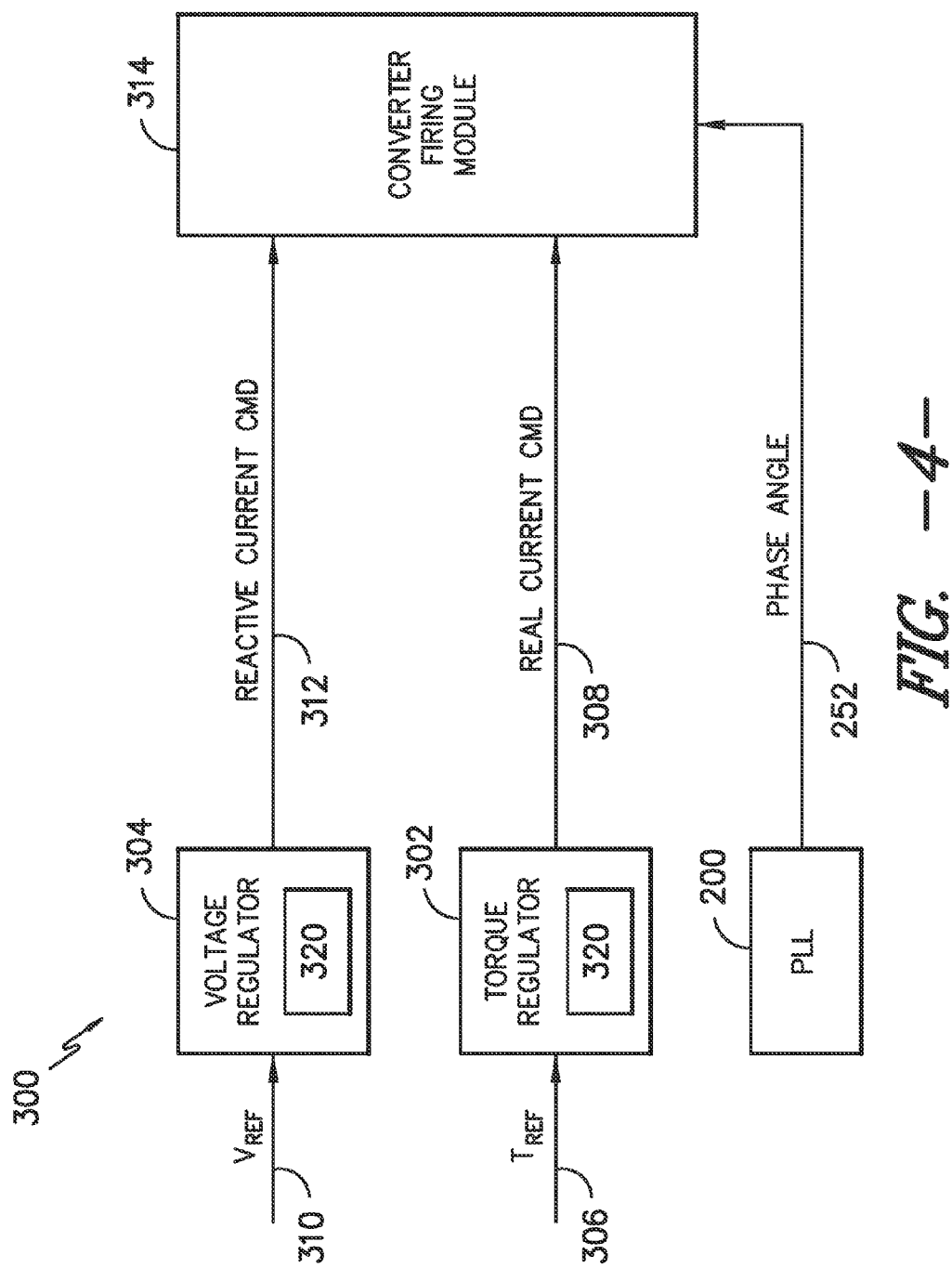
FIG. -4-

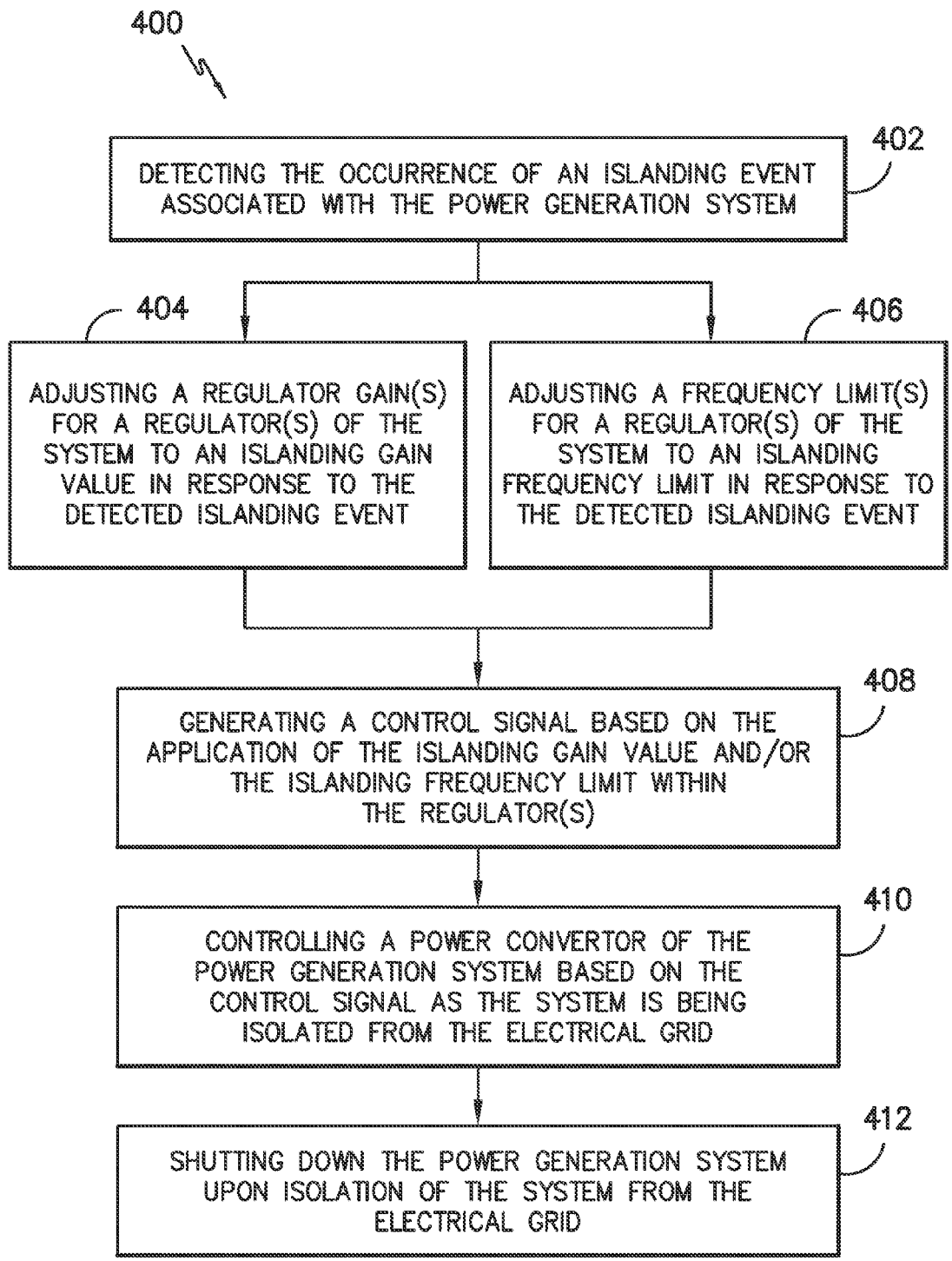
FIG. -5-

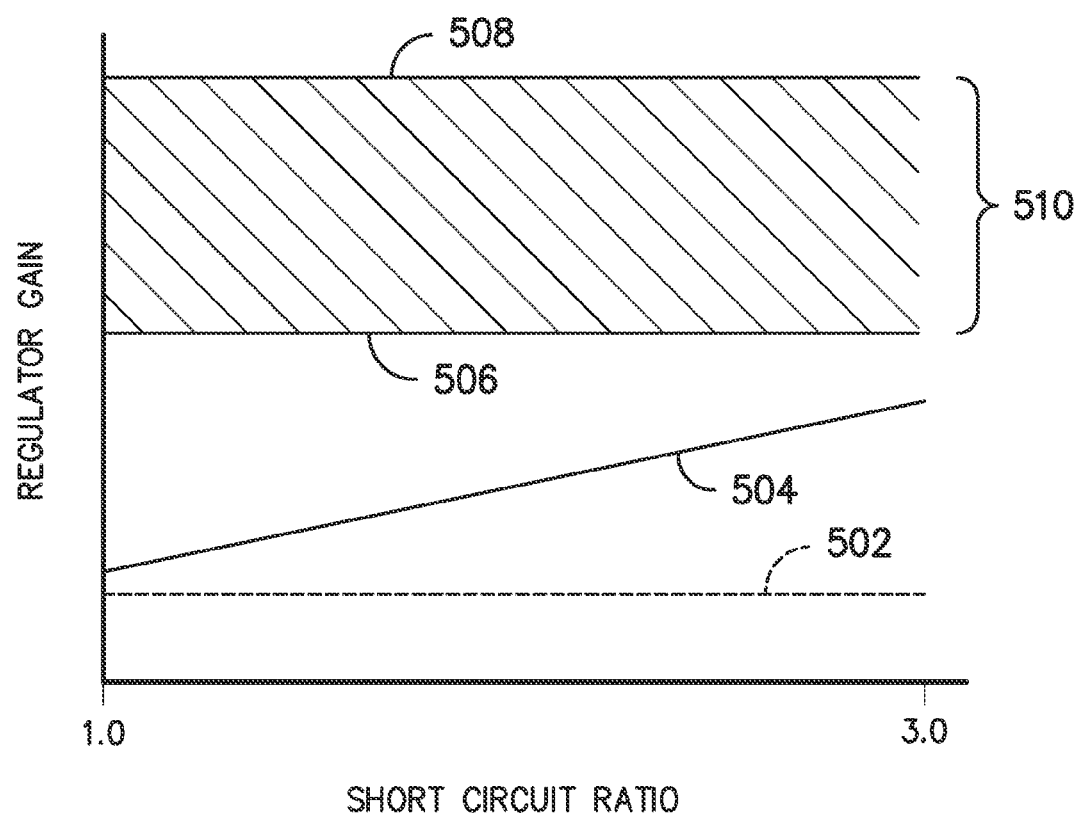
FIG. -6-

SYSTEM AND METHOD FOR CONTROLLING A POWER GENERATION SYSTEM BASED ON A DETECTED ISLANDING EVENT

FIELD OF THE INVENTION

The present subject matter relates generally to power generation systems and, more particularly, to a system and method for controlling aspects of the operation of a power generation system based on the detection of an islanding event in order to allow the system to be safely and efficiently shut down without damaging equipment.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid. An exemplary power generation system may generate AC power using a wind-driven doubly fed induction generator (DFIG). A power converter can regulate the flow of electrical power between the DFIG and the grid.

In many instances, power generation systems may be located in remote areas far from the loads they serve. This is particularly true for renewable energy sources, such as wind turbine systems, solar/photovoltaic systems, hydroelectric systems and/or the like. Typically, such power generation systems are connected to the electrical grid through an electrical system including long transmission lines connected to the grid using one or more breakers.

As is generally understood, a grid fault may occur within or along the electrical system connecting a power generation system to the grid, which may result in a transient event (e.g., a high voltage event, a low voltage event or a zero voltage events) that can detrimentally impact the various components of the power generation system unless a suitable corrective action is taken. In some instances, some types of grid fault may result in the opening of a protective breaker upstream of the power generation system such that the system experiences the opening of one or more phase conductors of the electrical system, thereby causing an islanding event for the power generation system. Unfortunately, islanding events resulting from the sudden tripping of a transmission line breaker at the grid side while the power generation system is under load may result in an overvoltage on the transmission line that can lead to damage to the one or more components of the power generation system, particularly the power converter and its related components or up-tower components. Some of this damage can also result in an in-proper shutdown of the equipment after the islanding event.

Typically, the corrective action required in response to an islanding event is a complete shutdown of the power generation system. However, if the generator is tripped prior to the breakers and/or the contactors of the power generation system being opened, a significant amount of damage may occur to one or more of the system components due to the grid shunt capacitance remaining on the isolated grid. Thus, it is often desirable to temporarily maintain operation of the system until it can be ensured that the proper breakers and/or contactors are open. Unfortunately, due to the unique operating parameters associated with an islanding event, conventional control methodologies are not adapted to properly control the power converter and other electrical components of the power generation system in a manner that allows for a safe and efficient shut down of the system.

Accordingly, an improved system and method for controlling aspects of the operation of a power generation system that allow for the system to be safely and efficiently shut down in response to the detection of an islanding event would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the operation of a power generation system configured to supply power to an electrical grid. The method may generally include detecting an occurrence of an islanding event associated with the power generation system and adjusting a regulator gain applied within a regulator of the power generation system to an islanding gain value in response to the detection of the islanding event, wherein the islanding gain value exceeds a maximum gain value defined for the regulator in the event of an occurrence of any ride-through transient event. In addition, the method may include controlling a power converter of the power generation system based on a control signal generated by the regulator as the power generation system is being isolated from the electrical grid and shutting down the power generation system upon isolation of the power generation system from the electrical grid.

In another aspect, the present subject matter is directed to a method for controlling the operation of a power generation system configured to supply power to an electrical grid. The method may generally include detecting an occurrence of an islanding event associated with the power generation system and adjusting a frequency limit applied within a phase-locked loop (PLL) regulator of the power generation system to an islanding frequency limit in response to the detection of the islanding event, wherein the islanding frequency limit exceeds a maximum frequency limit defined for the PLL regulator in the event of an occurrence of any ride-through transient event or is less than a minimum frequency limit defined for the PLL regulator in the event of the occurrence of any ride-through transient event. In addition, the method may include controlling a power converter of the power generation system based on a control signal generated by the PLL regulator as the power generation system is being isolated from the electrical grid and shutting down the power generation system upon isolation of the power generation system from the electrical grid.

In a further aspect, the present subject matter is directed to a power generation system including a generator, a power converter coupled to the generator; and a computing device configured to control the operation of the power converter. The computing device may store instructions that, when implemented by one or more processors, configure the computing device to detect an occurrence of an islanding event associated with the power generation system and adjust a regulator gain applied within a regulator to an islanding gain value in response to the detection of the islanding event, wherein the islanding gain value exceeds a maximum gain value defined for the regulator in the event of an occurrence of any ride-through transient event. In addition, the computing device may be configured to control the power converter based on a control signal generated by the regulator as the power generation system is being isolated from the electrical grid and shut down the power generation system upon isolation of the power generation system from the electrical grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a schematic diagram of one embodiment of a wind turbine system in accordance with aspects of the present subject matter;

FIG. 3 illustrates a schematic diagram of one embodiment of a phase-locked loop (PLL) regulator suitable for use with the wind turbine system shown in FIG. 2;

FIG. 4 illustrates a schematic diagram of one embodiment of a system for controlling a power generation system in accordance with aspects of the present subject matter;

FIG. 5 illustrates a flow diagram of one embodiment of a method for controlling a power generation system in accordance with aspects of the present subject matter; and FIG. 6 illustrates an example graph showing the differing gain values that may be applied within one or more of the regulators of a power generation system having a relatively low short circuit ratio, particularly illustrating a range of islanding gain values that may be applied within the regulator(s) in response to an islanding event that far exceed the maximum gain values allowed for continued, stable operation of the system during a ride-through transient event.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the operation of a power generation system in response to a detected islanding event. Specifically, in several embodiments, the gain value(s) and/or frequency limit(s) applied within one or more of the system regulators (e.g., a phase-locked loop (PLL) regulator, voltage regulator, torque regulator and/or the like) may be increased significantly to allow for more aggressive control of the power convertor. As will be described below, such aggressive gains and/or frequency limits may exceed the maximum gain(s) and/or frequency limit(s) that are allowed to be applied within the regulator(s) during any ride-through transient event (e.g., a voltage ride-through event) in order to maintain continued, stable operation of the system. In other words, the aggressive gains and/or frequency limits may far exceed the regulator settings designed to allow for stable operation during normal transient events. However, given the rapidly changing operating environment associated with an islanding event, the aggressive gains and/or frequency limits may be applied in a manner that allow for temporary, effective control of the power convertor until the power generation system can be safely shut down.

It should be appreciated that, although the present subject matter will generally be described herein with respect to a wind turbine system, the disclosed system and method may generally be utilized within any suitable power generation system in order to facilitate the safe and efficient shut down of a power generation system in response to an islanding event. For instance, as an alternative to a wind turbine system, the present subject matter may be implemented within a solar power system.

It should also be appreciated that, although the present subject matter will generally be described herein with reference to islanding events, the disclosed system and method may be implemented in response to any suitable grid and/or system event for which the corrective action corresponds to isolation and eventual shut down of a power generation system.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Referring now to FIG. 2, a schematic diagram of one embodiment of a wind turbine system 100 is illustrated in accordance with aspects of the present subject matter. As shown, the rotor 18 of the wind turbine 10 may, optionally, be coupled to a gear box 118, which is, in turn, coupled to a generator 120. In several embodiments, the generator 120 may be a doubly fed induction generator (DFIG). However, in other embodiments, the generator 120 may correspond to any other suitable type of generator.

The generator 120 may be coupled to a stator bus 154 and a power converter 162 via a rotor bus 156. The stator bus 154 may provide an output multiphase power (e.g. three-phase power) from a stator of the generator 120 and the rotor bus 156 may provide an output multiphase power (e.g. three-phase power) from a rotor of the generator 120. As shown in FIG. 2, the power converter 162 includes a rotor side converter 166 and a line side converter 168. The generator 120 may be coupled via the rotor bus 156 to the rotor side converter 166. Additionally, the rotor side converter 166 may be coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using suitable switching elements, such as insulated gate bipolar transistors (IGBTs) or any other suitable switching elements. The rotor side converter 166 and the line side converter 168 may be coupled via a DC link 136 across which one or more DC link capacitors 138 may be arranged in any parallel and/or series combination.

In addition, the power converter 162 may be coupled to a controller 174 configured to control the operation of the rotor side converter 166 and the line side converter 168. In general, the controller 174 may correspond to any suitable computing device and/or combination of computing devices. For instance, in several embodiments, the controller 174 may include one or more processor(s) and associated memory device(s configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions including, but not limited to, computer-implemented methods described herein.

In typical configurations, various line contactors and circuit breakers including, for example, a grid breaker 182 may also be included for isolating the various components as necessary for normal operation of the generator 120 during connection to and disconnection from the electrical grid 184. For example, a system circuit breaker 178 may couple the system bus 160 to a transformer 180, which may be coupled to a grid bus 186 via the grid breaker 182. In alternative embodiments, fuses may replace some or all of the circuit breakers.

In operation, alternating current power generated at the generator 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of generator 120 to provide multi-phase power (e.g. three-phase power) having a frequency maintained substantially at the frequency of the electrical grid 184 (e.g. 50 Hz or 60 Hz). In addition, the power flow from the rotor 18 through the converters 166, 168 and to the grid 184 may be in the other direction.

Additionally, various circuit breakers and switches, such as grid breaker 182, system breaker 178, stator sync switch 158, converter breaker 198, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the controller 174. The control signals may be based, among other things, on sensed conditions or operating characteristics of the wind turbine system 100. Typically, the control signals provide for control of the operation of the power converter 162. For example, feedback in the form of a sensed speed of the generator 120 may be used to control the conversion of the output power from the rotor bus 156 to maintain a proper and balanced multi-phase (e.g. three-phase) power supply. In particular, the sensed speed may be used as a basis for adjusting the switching frequency of the switching elements. Additionally, feedback from other sensors may also be used by the controller 174 to control the power converter 162, including, for example, stator, rotor and/or grid bus voltages, voltages associated with the switching elements and current feedbacks. Using the various forms of feedback information, switching control signals (e.g. gating control commands for the switching elements), stator synchronizing control signals, circuit breaker signals and/or other suitable control commands/signals may be generated.

Additionally, in several embodiments, the controller 174 may also be configured to receive feedback from a phase-locked loop (PLL) regulator 200. As is generally understood, the PLL regulator 200 may include or correspond to a closed looped circuit configured to detect phase information regarding a reference voltage (e.g., the grid voltage) and generate a resulting phase angle signal to be used by the controller 174 for controlling the operation of the power converter 172 in a manner that synchronizes the converter's output voltage to the reference voltage. It should be appreciated that, although the PLL regulator 200 is illustrated herein as being separate from the controller 174, the PLL regulator 200 may be integrated into and/or form part of the controller 174. Alternatively, the PLL regulator 200 may be implemented on a separate computing device that is communicatively coupled to the controller 174.

In several embodiments, the PLL regulator 200 may be coupled to one or more voltage transduces 190 for receiving reference voltage measurements. For instance, as shown in FIG. 2, the PLL regulator 200 is coupled to three different voltage transducers 190 (e.g., via electrical conduits 192, 194, 196), with each voltage transducer 190 being coupled to one of the three phases of the grid bus 186. Alternatively, the PLL regulator 200 may be coupled to one or more voltage transducers configured to measure the voltage at any other suitable location within the system 100.

Referring now to FIG. 3, a schematic diagram of one embodiment of a PLL regulator 200 suitable for use within the wind turbine system 100 shown in FIG. 2 is illustrated in accordance with aspects of the present subject matter. As indicated above, the PLL regulator 200 may be coupled to a plurality of voltage transducers 190 (e.g., via electrical conduits 192, 194, 196) for monitoring the grid voltage across phases A, B and C of the grid bus 186.

As shown in FIG. 3, the PLL regulator 200 may include at least one phase-locked loop (PLL) 202 corresponding to a closed-loop feedback scheme configured to maintain signals generated by the PLL regulator 200 in a fixed phase relationship with a reference signal. As is generally understood, the PLL-generated signal may be constantly adjusted to match, in phase, the frequency of the reference signal, i.e., the PLL "locks on" to the reference signal. In the illustrated embodiment, the PLL 202 is configured to lock on to the frequency of grid bus 186.

In general, the PLL 202 may include a phase detector function block 204 that is configured to receive sinusoidal voltage measurement signals transmitted from the voltage transducers 190 for the A-phase, B-phase and C-phase of the grid bus 186. As shown in FIG. 3, the phase detector 204 is also configured to receive a phase angle feedback signal 206 corresponding to an output signal of the PL 202L. The phase detector 204 may generally be configured to combine the voltage measurement signals with the feedback signal 206 to a generate phase error signal 208 (e.g., measured in radians (r)).

In addition, the PLL 202 may also include a proportional-integral (PI) filter 210. As shown, the PI filter 210 may generally include a proportional gain function block 212 and an integral gain function block 214, both of which are configured to receive the phase error signal 208 transmitted from the phase detector 204. The proportional gain function block 212 may also be configured to receive a proportional gain constant signal 216 from a proportional gain constant register 218. The register 218 may be populated with a plurality of proportional gain values to be applied based on the operating state of the disclosed system 100. As is generally understood, the proportional gain function block 212 may be configured to multiply the phase error signal 208 by the gain constant signal 216 to generate a proportional gain signal 222 (e.g., measured in r/s). Similarly, in addition to the phase error signal 208, the integral gain function block 214 may be configured to receive an integral gain constant signal 224 from an integral gain constant register 226, which may be populated with a plurality of integral gain values to be applied based on the operating state of the disclosed system 100. As is generally understood, the integral gain function block 214 may be configured to integrate the phase error signal 208 with respect to time and multiply the integral value by the gain constant signal 224 to generate an integral gain signal 228 (e.g., measured in r/s).

The PI filter 210 may also include a first clamping function block 230 configured to receive the integral gain signal 228. In general, the first clamping function block 230 may correspond to a filter mechanism configured to evaluate the integral gain signal 228 based on a high frequency limit and a low frequency limit and generate a clamped integral gain signal 232 (e.g., measured in r/s) based on the such frequency limits. Specifically, if the integral gain signal 228 falls within the range defined between the high and low frequency limits, the resulting clamped integral gain signal 232 may correspond to the integral gain signal. However, if the integral gain signal 228 falls outside of the range defined by the high and low frequency limits, the resulting clamped integral gain signal 232 may correspond to the high frequency limit (e.g., if the integral gain signal 228 exceeds the high frequency limit) or the low frequency limit (e.g., if the integral gain signal 228 is lower than the low frequency limit). As shown in FIG. 3, the high and low frequency limits applied within the first clamping function block 230 may be transmitted to and populated within a high limit register 234 and a low limit register 236, respectively.

Additionally, the PI filter 210 may include a summation block 238 configured to sum the proportional gain signal 222 and the claimed integral gain signal 232 to generate a PI signal 240 (e.g., measure in r/s). Such signal 240 may then be transmitted to a second clamping function block 242. Similar to the first clamping function block 230, the second clamping function block 242 may generally correspond to a filter mechanism configured to evaluate the PI signal 240 based on a high frequency limit and a low frequency limit and generate a clamped PI signal 244 (e.g., measured in r/s) based on the such frequency limits. Specifically, if the PI signal 240 falls within the range defined between the high and low frequency limits, the resulting clamped PI signal 244 may correspond to the PI signal 240. However, if the PI signal 240 falls outside of the range defined by the high and low frequency limits, the resulting clamped PI signal 244 may correspond to the high frequency limit (e.g., if the PI signal 240 exceeds the high frequency limit) or the low frequency limit (e.g., if the PI signal 240 is lower than the low frequency limit). As shown in FIG. 3, the high and low frequency limits applied within the second clamping function block 242 may be transmitted to and populated within a high limit register 246 and a low limit register 248, respectively.

Moreover, the PLL 202 may also include an integrating function block 250 configured to configured to receive the clamped PI signal 244. In general, the integrating function block 240 may be configured to integrate the clamped PI signal 244 with respect to time in order to generate a phase angle signal 252 (e.g., measured in radians (r)). The phase angle signal 252 may then be transmitted to the controller 174 for use in controlling the power converter 162. Specifically, the controller 174 may be configured to use to the phase angle signal 252 to control the operation of the power converter 162 in a manner that synchronizes the converter's output voltage with the measured grid voltage. As shown in FIG. 3, the phase angle signal 252 may also correspond to the phase angle feedback signal 206 transmitted to phase detector 204 in order to determine the phase error signal 208 as described above.

Referring now to FIG. 4, a schematic view of one embodiment of a system 300 for controlling the operation of a power generation system is illustrated in accordance with aspects of the present subject matter. In several embodiments, the various system components shown in FIG. 4 may be implemented within the controller 174 described above, such as by being implemented via computer-readable instructions stored within and executable by the controller 174. Alternatively, one or more of the system components may be implemented using a separate computing device that is communicatively coupled to the controller 174.

As shown, the system 300 may include both a torque regulator 302 and a voltage regulator 304. The torque regulator 302 may generally be configured to receive a reference torque signal 306 (e.g., a reference value stored within the controller 174) and generate a real current command 308 based on the reference torque signal 306. Additionally, the voltage regulator 304 may be configured to receive a reference voltage signal 310 (e.g., based on the voltage measurement signals provided by the voltage transducers 190 described above) and generate a reactive current command 312 based on the reference voltage signal 310.

As is generally understood, the real and reactive current commands 308, 312, together with the phase angle signal 252 generated by the PLL regulator 200, may be transmitted to a converter firing module 314 (e.g., implemented via computer-readable instructions included within the controller 174 and/or any other suitable computing device) configured to control the operation of the power converter 162. For example, in one embodiment, the converter firing module 314 may be configured to transmit suitable gating signals to one or more gate drivers for controlling the activation of the switching elements contained within the power converter 162. As such, based on the current commands 308, 312 and the phase angle signal 252, the converter firing module 314 may be configured to control the operation of the power converter 162 in a manner consistent with the disclosure provided herein.

As shown in FIG. 4, the torque and voltage regulators 302, 304 may each include a proportional-integral (PI) filter 320 providing a closed-loop feedback mechanism to facilitate minimizing the steady state error in the generated current commands 308, 312. Thus, similar to the PLL regulator 200 described above, the PI filter 320 for each regulator 302, 304 may be configured to utilize both proportional gain constants and integral gain constants (e.g., stored in suitable registers (not shown)) to compensate for differences in the current commands 308, 312 relative to suitable feedback signals input into the filters 320.

Typically, the gains applied within the various regulators 200, 302, 304, as well as the frequency limits applied within the PLL regulator 200, are selected so as to maintain stable, continuous operation of the wind turbine system 100 across a wide range of system and/or grid conditions. For example, during normal operation, the gains/limits applied within the regulators may correspond to normal or sluggish gains. However, during certain ride-through transient events (e.g., voltage ride-through events), the gains/limits may be increased to facilitate continued, stable operation of the various electrical components of the wind turbine system 100 in a manner that allows the system to "ride through" such event(s). However, as will be described below, when an islanding event is detected, it may be desirable to effectuate an immediate and safe shut down of the wind turbine system 100. In doing so, the gains/limits applied within the regulators may be increased well beyond the gains/limits that would be allowed for continued, stable operation of the wind turbine system 100 during any other type of transient event. Such highly aggressive gains/limits may allow for the regulators to more effectively and efficiently adjust the operation of the wind turbine system 100 in order to maintain control of the various electrical system components in response the detected islanding event until the system can be isolated from the electrical grid and safely shut down.

It should be appreciated that, as used herein, the term "ride-through transient event" generally refers to any suitable grid-related and/or system-related transient event for which the power generation system is configured to "ride through" or otherwise maintain continued operation during and after the termination of such event. In other words, a ride-through transient event may generally correspond to any suitable transient event for which the corrective action to be applied within the power generation system does not correspond to an eventual system shut-down, but rather, a suitable control action for controlling the various system components in a manner that allows for continued operation during and after such event. For instance, examples of ride-through transient events may include, but are not limited to, voltage ride-through events, such as a low voltage ride-through (LVRT) event, a high voltage ride-through (HVRT) event or a zero voltage ride-through (ZVRT) event, and various other types of grid-related and/or system-related transient events.

Referring now to FIG. 5, one embodiment of a method 400 for controlling a power generation system in response to a detected islanding event is illustrated in accordance with aspects of the present subject matter. In general, the method 400 will be described herein as being implemented using a wind turbine system, such as the wind turbine system 100 described above with reference to FIGS. 2-4. However, it should be appreciated that the disclosed method 400 may be implemented using any other suitable power generation system that is configured to supply power for application to a load. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 5, at (402) the method 400 includes detecting the occurrence of an islanding event associated with the power generation system. In general, it should be appreciated that islanding events may be detected using any suitable islanding detection means and/or methodology known in the art. For example, in several embodiments, the occurrence of an islanding event may be detected by the controller 174 by monitoring (e.g., via a plurality sensors coupled to the controller 174) one or more system and/or grid operating parameters so as to allow for the detection of an initial indicator of an islanding event. Specifically, islanding events typically result in unique and/or substantial variations in one or more of the system and/or grid operating parameters, thereby providing an indication that an islanding event is occurring as opposed to a different system and/or grid event (e.g., a short circuit within the system, voltage ride-through event and/or any other suitable transient event). For example, operating conditions that often provide an initial indication of the occurrence of an islanding event include, but are not limited to, a rapid change in the phase angle of one or more of the phases of the AC voltage (e.g., at the system bus 160 or the grid bus 186), an amplitude overvoltage at a given location within the system (e.g., at the system bus 160, the grid bus 186 or DC link 136), a rapid change in frequency in one or more phases of the system bus 160 or the grid bus 186, a significant change in the grid impedance, an indication that the grid breaker 182 has opened and/or any other suitable operating conditions that may be indicative of the occurrence of an islanding event.

After the detection an initial indicator of an islanding event, the controller 173 may be configured to make a determination as to whether it is more likely than not that an islanding event is actually occurring based on the detected indicator(s). In doing so, the controller 174 may, for example, be configured to compare the detected indicator(s) to a predetermined threshold(s) associated with such indicator(s). For example, if the detected indicator corresponds to a change in the voltage phase angle over a specific period of time, the controller 174 may be configured to determine whether the magnitude of the phase angle change exceeds a predetermined phase angle threshold (e.g., 30 degrees). Similarly, if the detected indicator corresponds to an amplitude overvoltage, the controller 174 may be configured to determine whether the overvoltage exceeds a predetermined voltage threshold (e.g., an overvoltage of 125% or more at the system bus 160 or grid bus 186).

In addition to comparing the detected indicator(s) to a predetermined threshold(s), the controller 174 may also be configured to adjust one or more of the gains (e.g., proportional gains and/or integral gains) applied within one or more of the various regulators of the power generation system in order to assist in determining whether an islanding event is actually occurring. For example, in several embodiments, the controller 174 may be configured to increase the gains associated with the PLL regulator 200, the voltage regulator 304 and/or the torque regulator 302 upon the detection of an initial indication of an islanding event. Such increased gains may provide for more aggressive control of the power converter 162, thereby increasing the system responsiveness and allowing for a more efficient and accurate determination as to whether the detected indicator(s) is associated with the occurrence of an actual islanding event.

Upon the detection of an islanding event, the controller 174 may be configured to make a highly aggressive adjustment to one or more of the gains and/or frequency limits associated with one or more of the regulators of the power generation system so as to maintain effective control of the power converter for a short period of time until the system can be safely shut down. For example, as shown in FIG. 5, at (404), the method 400 includes adjusting a regulator gain(s) for one or more of the system regulators to an islanding gain value in response to the detected islanding event. As used herein, the term "islanding gain value" corresponds to one or more gain values that exceed the maximum gain value that would otherwise be allowed to be applied within the corresponding regulator during the occurrence of any potential ride-through transient event. In other words, the islanding gain value may generally correspond to one or more highly aggressive gain values that exceed the maximum regulator gain value(s) that may be applied during the occurrence of a ride-though transient event in order to maintain continued, stable operation of the power generation system (i.e., system operation that does not result in substantial damage to the any system components). For example, for a zero voltage ride-through event, one or more of the regulators included within a given power generation system may include a predetermined maximum gain value(s) that may be applied within the regulator(s) in order to maintain stable operation as the system "rides through" such event. In such instance, the islanding gain value to be applied within the regulator(s) in response to an islanding event may correspond to a gain value(s) that exceeds the predetermined maximum gain value(s) defined for zero voltage ride-through events.

For example, in several embodiments, the controller 174 may be configured to adjust the gain value(s) associated with the PLL regulator 200 and/or the voltage regulator 304 to more aggressive islanding gain values. Specifically, it has been found that, by substantially increasing the proportional and/or integral gains applied within the PLL regulator 200 to the disclosed islanding gain values, the PLL regulator 1—may be capable of effectively tracking the rapidly changing frequency and/or phase angle of the electrical grid occurring during the islanding event. Similarly, by substantially increasing the proportional and/or integral gains applied within the voltage regulator 304 to the disclosed islanding gain values, the voltage regulator 304 may be able to control the AC voltage within the power generation system in a manner that allows for temporary stable operation of the system until it can be safely shut-down.

It should be appreciated that, in addition to the PLL regulator 200 and/or the voltage regulator 304 (or as an alternative thereto), the controller 174 may be configured to adjust the gain value(s) associated with any other suitable regulator of the power generation system in response to an islanding event. For example, in one embodiment, the controller 174 may be configured to increase the proportional and/or integral gains applied within the torque regulator 302 to the more aggressive islanding gain values.

Similarly, as shown in FIG. 5, at (406), the method 400 includes adjusting a frequency limit(s) for one or more of the regulators to an islanding frequency limit in response to the detection of the islanding event. As used herein, the term "islanding frequency limit" corresponds to any maximum frequency limit that exceeds the maximum frequency limit that would otherwise be allowed to be applied within the corresponding regulator during the occurrence of any potential ride-through transient event and/or any minimum frequency limit that is less than the minimum frequency limit that would otherwise be allowed to be applied within the corresponding regulator during such ride-through transient event. In other words, the islanding frequency limit may generally correspond to one or more highly aggressive frequency limits that fall outside the maximum and/or minimum frequency limits that may be applied during the occurrence of a ride-though transient event in order to maintain continued, stable operation of the power generation system. For instance, for a zero voltage ride-through event, one or more of the regulators included within a given power generation system may include predetermined maximum and minimum frequency limits that may be applied within the regulator(s) in order to maintain stable operation as the system "rides through" the event. In such instance, the islanding frequency limit(s) to be applied within the regulator(s) in response to an islanding event may correspond to a frequency limit(s) that falls outside the predetermined maximum and minimum frequency limit(s) defined for zero voltage ride-through events.

For example, in several embodiments, the controller 174 may be configured to adjust the frequency limit(s) associated with the PLL regulator 200 to more aggressive islanding frequency limits. Specifically, by substantially increasing the maximum frequency limit and/or substantially decreasing the minimum frequency limit applied within the PLL regulator 200 to the disclosed islanding frequency limits, the PLL regulator 200 may be capable of more effectively tracking the rapidly changing frequency and/or phase angle of the electrical grid occurring during the islanding event. Additionally, it should be appreciated that, in alternative embodiments, the controller 174 may be configured to adjust the frequency limit(s) associated with any other suitable regulator included within the power generation system in response to an islanding event, such as the voltage regulator 304 and/or the torque regulator 302.

It should also be appreciated that, in several embodiments, the disclosed system and method may be particularly advantageous when applied within a power generation system that is coupled to a relatively weak grid. For example, in one embodiment, it may be desirable to apply the present subject matter within power generation systems having a short circuit ratio ranging from about 1.0 to about 3.0, such as from about 1.3 to about 2.7 or from about 1.5 to about 2.5 and any other subranges therebetween. However, in other embodiments, it should be readily appreciated that the disclosed system and method may also be advantageously applied within power generation systems having short circuit ratios exceeding 3.0 or short circuit ratios below 1.0 to allow for enhanced control of such systems during an islanding event.

As used herein, the term "short circuit ratio" generally refers to the ratio of the short circuit power at a reference location looking toward the grid to the total rated power of the power generation system (e.g., the summation of the power ratings of the turbines included within a wind farm) and, thus, the ratio provides for a direct indication of the strength or weakness of the associated electrical grid. This ratio can be defined at any suitable reference location, such as at the high side of the system's transformer and/or the point of common coupling (POCC). For example, if the measurement point is at the point of common coupling and the short circuit power at that point is 400 MVAR, and the total wind farm capacity is 200 MVAR, then the short circuit ratio is 2.0. On the other hand the power basis for the wind farm could also be expressed in terms of real power, or MW.

FIG. 6 illustrates a graph providing differing gain values that may be applied within one or more of the regulators of a power generation system having a short circuit ratio ranging from about 1.0 to about 3.0 in accordance with aspects of the present subject matter. As shown, line 502 generally represents an example gain value that may be applied within one or more of the system regulators during normal operation of the power generation system. Additionally, line 504 generally represents the maximum gain values that may be applied within one or more of the system regulators to allow for continuous, stable operation of the power generation system during the occurrence of a ride-through transient event. In other words, line 504 may represent the maximum values defined for the regulator(s) to allow the system to "ride through" the transient event. As shown, the maximum gain values 504 allowed for ride-through transient events may steadily increase with increases in the short circuit ratio.

Moreover, as shown in FIG. 6, lines 506 and 508 generally represent example gain values between which a range 510 of suitable islanding gain values are defined for adapting the control of the power generation system during the occurrence of an islanding event. As shown, the islanding gain values 510 clearly exceed the maximum gain values 504 defined for the regulator(s) and, thus, would not be used to provide continued stable operation of the power generation system while it "rides through" a given ride-through transient event. However, during an islanding event, the application of such aggressive islanding gains 510 may allow for effective, temporary control of the power generation system until the system can be safely shut down.

It should be appreciated that a similar type of graph to that shown in FIG. 6 may also be provided to show the distinction between the disclosed islanding frequency limits and the frequency limits typically utilized within a given power generation system. As indicated above, the maximum islanding frequency limit(s) may generally exceed the maximum frequency limit(s) otherwise allowed for operation during a ride-through transient event(s). Similarly, the minimum islanding frequency limit(s) may generally exceed the minimum frequency limit(s) otherwise allowed for operation during a ride-through transient event(s).

Referring back to FIG. 5, at (408), the method 400 includes generating a control signal based on the application of the islanding gain value(s) and/or the islanding frequency limit(s) within the regulator(s). For example, as indicated above, the PLL regulator 200 may be configured to generate a phase angle signal configured to facilitate control of the power converter 162 while the torque and voltage regulator 302, 304 may be configured to generate currents commands 308, 312 for controlling the power converter 1652. By applying an aggressive islanding gain value(s) and/or frequency limit(s) within one or more of the regulators, the corresponding control signal(s) generated by such regulator(s) may allow for more aggressive control of the power converter 162 in response to the islanding event.

Additionally, at (410), the method 400 includes controlling the power converter of the power generation system based on the control signal(s) as the system is being isolated from the electrical grid. Specifically, the aggressive control signal(s) generated by the regulator(s) may allow for the power converter 162 to be controlled in an effective manner until one or more of the internal breakers and/or contactors of the system 100 (e.g., system breaker 178, line contactor 172, converter breaker 198, stator switch 158) can be opened, thereby isolating the power generation system from the grid. Upon isolation of system from the electrical grid, the method 400 may, at (412) include safely shutting down the power generation system. It should be appreciated that the actual shut down of the power generation system may generally be effectuated using any suitable shut-down procedure and/or means known in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the operation of a power generation system configured to supply power to an electrical grid, the method comprising:
   detecting an occurrence of an islanding event associated with the power generation system, wherein the islanding event is caused by an opening of one or more phase conductors;
   adjusting a regulator gain applied within a regulator of the power generation system to an islanding gain value in response to the detection of the islanding event, wherein the islanding gain value exceeds a maximum gain value defined for the regulator in the event of an occurrence of any ride-through transient event;
   controlling a power converter of the power generation system based on a control signal generated by the regulator as the power generation system is being isolated from the electrical grid, the control signal being generated within the regulator as a function of the islanding gain value; and
   shutting down the power generation system upon isolation of the power generation system from the electrical grid.

2. The method of claim 1, wherein the power generation system has a short circuit ratio ranging from about 1.0 to about 3.0.

3. The method of claim 1, wherein the regulator comprises a phase-locked loop (PLL) regulator of the power generation system.

4. The method of claim 3, further comprising adjusting a frequency limit applied within the PLL regulator to an islanding frequency limit in response to the detection of the islanding event, wherein the islanding frequency limit exceeds a maximum frequency limit defined for the PLL regulator in the event of the occurrence of any ride-through transient event or is less than a minimum frequency limit defined for the PLL regulator in the event of the occurrence of any ride-through transient event.

5. The method of claim 4, whether the islanding frequency limit is applied within the PLL regulator when generating the control signal.

6. The method of claim 1, wherein the regulator comprises a voltage regulator of the power generation system.

7. The method of claim 1, wherein the ride-through transient event corresponds to a low voltage ride-through event, a high voltage ride-through event or a zero voltage ride-through event.

8. The method of claim 1, further comprising opening at least one of a breaker or a contactor of the power generation system in order to isolate the power generation system from the electrical grid.

9. A method for controlling the operation of a power generation system configured to supply power to an electrical grid, the method comprising:
    detecting an occurrence of an islanding event associated with the power generation system, wherein the islanding event is caused by an opening of one or more phase conductors;
    adjusting a frequency limit applied within a phase-locked loop (PLL) regulator of the power generation system to an islanding frequency limit in response to the detection of the islanding event, wherein the islanding frequency limit exceeds a maximum frequency limit defined for the PLL regulator in the event of an occurrence of any ride-through transient event or is less than a minimum frequency limit defined for the PLL regulator in the event of the occurrence of any ride-through transient event;
    controlling a power converter of the power generation system based on a control signal generated by the PLL regulator as the power generation system is being isolated from the electrical grid, the islanding frequency limit being applied within the PLL regulator when generating the control signal; and
    shutting down the power generation system upon isolation of the power generation system from the electrical grid.

10. The method of claim 9, wherein the power generation system has a short circuit ratio ranging from about 1.0 to about 3.0.

11. A power generation system, the system comprising:
    a generator;
    a power converter coupled to the generator; and
    a computing device configured to control the operation of the power converter, the computing device storing instructions that, when implemented by one or more processors, configure the computing device to:
        detect an occurrence of an islanding event associated with the power generation system, wherein the islanding event is caused by an opening of one or more phase conductors;
        adjust a regulator gain applied within a regulator to an islanding gain value in response to the detection of the islanding event, wherein the islanding gain value exceeds a maximum gain value defined for the regulator in the event of an occurrence of any ride-through transient event;
        control the power converter based on a control signal generated by the regulator as the power generation system is being isolated from the electrical grid, the control signal being generated within the regulator as a function of the islanding gain value; and
        shut down the power generation system upon isolation of the power generation system from the electrical grid.

12. The system of claim 11, wherein the power generation system has a short circuit ratio ranging from about 1.0 to about 3.0.

13. The system of claim 11, wherein the regulator comprises a phase-locked loop (PLL) regulator implemented within or coupled to the controller.

14. The system of claim 13, wherein the controller is further configured to adjust a frequency limit applied within the PLL regulator to an islanding frequency limit in response to the detection of the islanding event, wherein the islanding frequency limit exceeds a maximum frequency limit defined for the PLL regulator in the event of the occurrence of any ride-through transient event or is less than a minimum frequency limit defined for the PLL regulator in the event of the occurrence of any ride-through transient event.

15. The system of claim 14, wherein the islanding frequency limit is applied within the PLL regulator when generating the control signal.

16. The system of claim 11, wherein the regulator comprises a voltage regulator implemented within or coupled to the controller.

17. The system of claim 11, wherein the ride-through transient event corresponds to a low voltage ride-through event, a high voltage ride-through event or a zero voltage ride-through event.

18. The system of claim 11, wherein the controller is further configured to open at least one of a breaker or a contactor of the power generation system in order to isolate the power generation system from the electrical grid.

* * * * *